(12) United States Patent
Madoux et al.

(10) Patent No.: US 10,183,575 B2
(45) Date of Patent: Jan. 22, 2019

(54) VALVE APPARATUS WITH A WEIGHT CONTROL SYSTEM

(71) Applicant: Plastic Omnium Advanced Innovation and Research, Brussels (BE)

(72) Inventors: Dominique Madoux, Rumes (BE); Jules-Joseph Van Schaftingen, Wavre (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 15/383,149

(22) Filed: Dec. 19, 2016

(65) Prior Publication Data

US 2017/0174073 A1 Jun. 22, 2017

(30) Foreign Application Priority Data

Dec. 22, 2015 (EP) ..................................... 15202165

(51) Int. Cl.
*F16K 24/04* (2006.01)
*B60K 15/035* (2006.01)

(52) U.S. Cl.
CPC .. *B60K 15/03504* (2013.01); *B60K 15/03519* (2013.01); *F16K 24/044* (2013.01); *Y10T 137/0874* (2015.04)

(58) Field of Classification Search
CPC ........ B60K 15/03504; B60K 15/03519; B60K 15/035; B60K 15/03289; F16K 24/044; F16K 24/04; F16K 24/06; F16K 27/07; Y10T 137/0874; Y10T 137/3099; F16L 47/02; F16L 47/14; F02M 37/017; F02M 37/0076

USPC ... 137/38–46, 15.26, 315.08, 409, 429, 430, 137/587, 588; 220/86.2, 745, 746; 141/59, 198, 202, 229; 123/516, 518, 123/198 D, 520

See application file for complete search history.

(56) References Cited

U.S. PATENT DOCUMENTS

| | | | |
|---|---|---|---|
| 1,906,052 A * | 4/1933 | Fina | F24D 19/081 137/165 |
| 4,274,431 A | 6/1981 | Keller | |
| 4,735,226 A | 4/1988 | Szlaga | |
| 6,450,192 B1 | 9/2002 | Romanek | |
| 2004/0007262 A1 | 1/2004 | Hattori | |
| 2006/0137922 A1* | 6/2006 | Ketcham | B60K 3/00 180/303 |

(Continued)

OTHER PUBLICATIONS

European Search Report dated May 27, 2016 in European Application 15202165, filed on Dec. 22, 2015.

*Primary Examiner* — Craig J Price
(74) *Attorney, Agent, or Firm* — Oblon, McClelland, Maier & Neustadt, L.L.P.

(57) ABSTRACT

A valve apparatus for use in a liquid tank, the valve apparatus including a casing defining a main chamber, the main chamber having at least one inlet orifice and at least one outlet orifice; a float including a closure element, the float being movable inside the main chamber between a first position and a second position in which the at least one outlet orifice is closed off by the closure element; a weight control system configured for controlling the weight of the float by transferring a load in and out from the float, such that the weight of the float in the second position is lower than the weight of the float in the first position.

11 Claims, 4 Drawing Sheets

(56) References Cited

U.S. PATENT DOCUMENTS

2011/0162728 A1    7/2011   Pifer et al.
2014/0041737 A1    2/2014   Pifer et al.

* cited by examiner

Fig. 2

VALVE APPARATUS WITH A WEIGHT CONTROL SYSTEM

The present invention relates to a valve apparatus for the venting of a liquid tank, in particular a fuel tank with which a motor vehicle may be equipped.

Fuel tanks for motor vehicles are nowadays generally provided with a venting circuit. This circuit allows air to be introduced into the tank in the event of under pressure (especially for compensating for the volume of liquid consumed) or allows the gases contained in the tank to be removed in the event of overpressure. This circuit also allows the ducting and possible filtering of the gases that have to be discharged into the atmosphere, for the purpose of meeting the ever stricter environmental requirements in this regard. This circuit generally includes a valve which as far as possible prevents liquid from coming out of the tank in the event of said tank rolling over or being at an excessively high angle of inclination. This valve generally comprises a float with a closure element adapted to close off a venting orifice. Constant efforts are being made to provide leak-tight closure of the venting orifice, especially when the valve remains immersed in the liquid for a prolonged period.

The object of embodiments of the invention is to provide a valve apparatus which operates with greater tight-sealing force. In particular, it is an object of the invention to provide a valve apparatus which reduces or suppresses the risk of leakage of liquid (i.e. static leakage) without modifying the Shut Off Height (SOH) of the valve.

According to an aspect of the invention, there is provided a valve apparatus for use in a liquid tank, said valve apparatus comprising:
- a casing defining a main chamber, the main chamber having at least one inlet orifice and at least one outlet orifice;
- a float comprising a closure element, the float being movable inside the main chamber between a first position and a second position in which said at least one outlet orifice is closed off by the closure element;
- a weight control system configured for controlling the weight of the float by transferring a load in and out from the float, such that the weight of the float in the second position is lower than the weight of the float in the first position.

Thus, it is proposed a valve apparatus equipped with a variable-weight float. More precisely, the weight control system according to the invention allows the float to have a first weight in the first position and a second weight in the second position, and the second weight is less than the first weight.

In a particular embodiment, the second position can be a position in which the float positions the closure element such that it closes (partially or totally) the outlet orifice(s) and the first position can be a position in which the closure element does not close (partially or totally) the outlet orifice(s).

In a particular embodiment, the first position can be the position in which the float is at rest within the main chamber. In the rest position the float may seat on a support provided in the main chamber.

Embodiments of the invention are based inter alia on the inventive insight that the weight of the float can be reduced (when the float occupies the second position) to increase the tight-sealing force (i.e. closing force on the outlet orifice(s)).

More in particular, the inventors have realized that it is possible to lighten the float in a manner such that the buoyant upward force acting on the float can have a greater effect.

In a particular embodiment, the float can be lightened (i.e. unballasted) in a progressive manner, in the sense that the weight control system according to the invention can lighten continuously or gradually the float as it moves along from the first position to the second position.

In another particular embodiment, the float can be lightened (i.e. unballasted) once it reaches the second position.

In yet another particular embodiment, the float can be lightened at a predetermined position before the closure element reaches or contacts with the outlet orifice(s).

The valve apparatus according to the invention is intended for the venting of a tank, which may contain any liquid.

In particular, the liquid may be a fuel. The tank may be intended for any use, especially for equipping a vehicle and more especially for equipping a motor vehicle.

In a particular embodiment, the size and shape of the casing of the valve apparatus according to the invention can be chosen in such a way that the valve apparatus can be entirely disposed in the interior of the tank, preferably by attachment to the inside of the top wall of the tank.

In a particular embodiment, the casing of the valve apparatus comprises a top surface comprising a bonding feature for facilitating the welding of the casing to the interior of the tank.

In another particular embodiment, the casing of the valve apparatus comprises bonding features for facilitating the welding of the casing to the external surface of the top wall of the tank.

In another particular embodiment, the casing of the valve apparatus is a part or is fixed to a flange or a support adapted to be attached to the tank. The main chamber can have one outlet orifice. Alternatively, the main chamber can have several outlet orifices. With this latter particular configuration, the reopening pressure can be reduced.

The valve apparatus according to the invention allows a liquid tank to be vented, both in normal operation and when filling. Further, it has the function of preventing ingress of liquid in the event of a vehicle rolling over or being excessively tilted.

Advantageously, the constituent elements of the valve apparatus may be made of any material. Preferably, they are based on a thermoplastic. In this case, it is obviously convenient to choose the material or materials in such a way that they withstand the operating stresses. Of course, the materials chosen must be compatible with the liquids with which they have to be in contact, in particular compatible with the fuels.

In particular in the case in which the liquid tank is a fuel tank made of plastic, most of the constituent elements of the valve apparatus according to the invention are also made of plastic. The term "plastic" is understood to mean any polymeric synthetic material, whether thermoplastic or thermosetting, as well as blends of at least two of these materials. The intended polymers comprise both homopolymers and copolymers (especially binary or ternary copolymers). Examples of such copolymers are, non-limitingly: random copolymers, linear block copolymers, non-linear block copolymers, and graft copolymers. Thermoplastic polymers, including thermoplastic elastomers, and blends thereof are preferred. Any type of thermoplastic polymer or copolymer is suitable.

In a particular embodiment, the closure element is made of rubber. In a particular embodiment, the closure element can be a needle seal or a ribbon seal.

In a particular embodiment, the weight control system is configured for adding weight to the float in the first position and for relieving weight on the float in the second position.

Thus, the weight control system can increase the weight of the float in the first position and can reduce the weight of the float in the second position, such that the weight of the float in the second position is lower than the weight of the float in the first position. Therefore, the weight control system allows a precise control of the weight ratio between the first position and the second position. This allows an optimized control of the tight-sealing force.

In a particular embodiment, the load can be in a solid form, liquid or gas form. In the particular embodiment where the load is in a solid form, the load can be of any shape, as long as it can be transferred in and out from the float.

In the particular embodiment where the load is in a liquid or gas form, the load can be transferred in or out from the float by the communicating vessels principle.

The float according to the invention can accommodate a load. For example, the float can comprise internal housing(s) and/or channel(s) for accommodating the load.

In a particular embodiment, the weight control system can be a mechanical based system. In one example, the weight control system can use gravity to realize the load transfer operations. In another example, the weight control system can comprise a spring-based system to realize the load transfer operations. In another example, the weight control system can comprise a magnet-based system to realize the load transfer operations. In yet another example, the weight control system can be a combination of the above.

In another particular embodiment, the weight control system can be an electronic based system. For example, an electronic control unit can be used to activate the weight control system for injecting a fluid inside the float in the first position and for sucking the fluid out of the float in the second position.

In an advantageous embodiment, the load comprises at least one ball.

The ball(s) may be made of any material. Preferably, the ball is based on a metal or metal alloy.

In a particular embodiment, the weight of the float in the first position is the combination of the self-weight of the float and the weight of the ball(s). The weight of the float in the second position is the self-weight of the float.

Thus, the float is lighter in the second position.

In a particular embodiment, the weight control system comprises at least one first channel formed in the float and at least one second channel formed in the casing, said at least one ball being adapted to roll inside the first and second channels, the first and second channels being arranged such that:
  in the first position, the first and second channels are in communication with one another so as to allow for transfer of said at least one ball from the casing to the float; and
  in the second position, the first and second channels are in communication with one another so as to allow for transfer of said at least one ball from the float to the casing.

This arrangement is particularly compact and easy to manufacture.

Advantageously, the first channel(s) is(are) made integral with the float and the second channel(s) is(are) made integral with the casing.

The float can comprise a plurality of first channels and the casing can comprise a plurality of corresponding second channels. In a particular embodiment, the float and the casing can be manufactured by injection molding process or by additive manufacturing process (i.e. 3D printing).

In a particular embodiment, the valve apparatus comprises a plurality of pairs of first channels, a plurality of pairs of second channels and a plurality of balls. The pairs are distributed in a homogeneous manner around the float and the casing. For example and in a non-restrictive way, the valve apparatus comprises three pairs of first and second channels which are distributed relative to one another at 120°.

In a particular embodiment, the valve apparatus further comprises a collection and discharge chamber for the liquid droplets, which is positioned at the bottom of the main chamber. Thus, the droplets that have been entrained with the gases coming from the tank can be collected and returned back to the tank, for example by gravity.

According to another aspect of the invention, there is provided a valve assembly comprising a common support supporting a valve apparatus as described above. In a particular embodiment, the common support is further adapted to support other components: another type of valve, a sensor, a fluid conduct, electrical wires.

According to another aspect of the invention, there is provided a fuel tank comprising at least one valve apparatus or valve assembly as described above, said at least one valve apparatus or valve assembly being attached to said fuel tank.

According to another aspect of the invention, there is provided a motor vehicle comprising a fuel tank as described above.

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

The present invention provides a valve apparatus for the venting of a liquid tank. In a particular embodiment, the valve apparatus of the present invention can be used in a fuel tank of a motor vehicle. The valve apparatus of the present invention can work as a Roll-Over Valve (ROV) or a Fill Limit Vent Valve (FLVV).

"Fuel" is understood to designate a mix of liquid or liquefied hydrocarbons, as normally used to power internal combustion engines, including fuels known as gasoline, diesel, ethanol, etc. The valve apparatus of the present invention is particularly suited for venting fuel tanks containing fuel having a relatively high vapour pressure such as gasoline.

The fuel tank used in conjunction with the invention is preferably made of plastic.

The wall of the fuel tank may be composed of a single thermoplastic layer, or of two layers. One or more other possible additional layers may, advantageously, be composed of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

When the valve apparatus according to the present invention is attached to a fuel tank, it is preferably attached thereto by welding. The welding can be performed during the parison moulding stage of the fuel tank. Alternatively, the welding can be performed after or during the fuel tank finishing operations (boring and welding).

In a particular embodiment, the valve apparatus is attached on the outer surface of the tank, for instance by boring and welding.

Alternatively, the valve apparatus can be attached onto the inner side of an injected shell of a fuel tank or a urea tank by hot plate welding or laser welding or ultrasonic welding.

In a particular embodiment, a part of the valve apparatus, such that for example and in a non-restrictive way, the cover and/or the casing, can be injected with the tank.

Alternatively, the valve apparatus can also be attached onto the inner side of a tank shell by an infra-red welding process. Such process is for example described in patent document U.S. Pat. No. 7,829,819.

Alternatively, the valve apparatus can be attached to the tank by plastic overmoulding process.

Alternatively, the valve apparatus can be attached to the tank by a locking ring system or by any other mean known in the state of the art.

Figure 1:
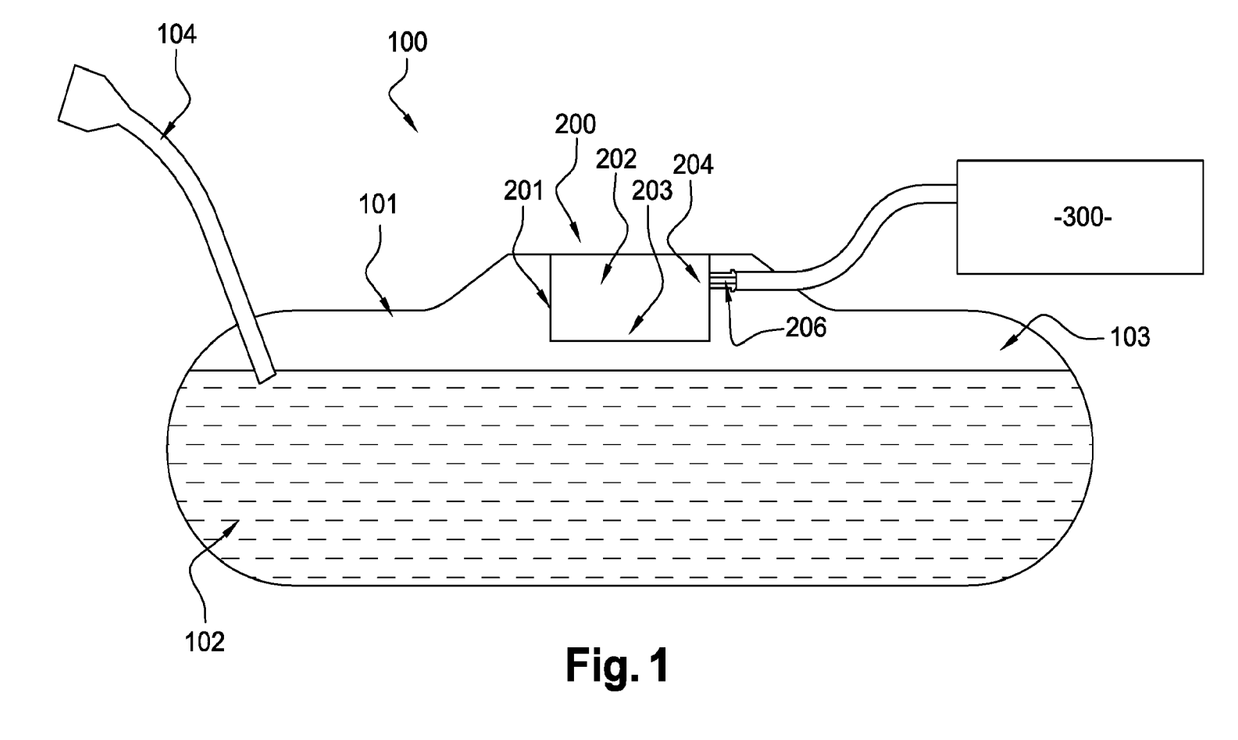
FIG. 1 illustrates schematically a valve apparatus according to an embodiment of the invention, installed in an exemplary manner in a fuel tank.

FIG. 1 depicts a sectional schematic view of a fuel tank 100 having a tank shell 101. A tank filler pipe 104 provides an entry for fuel into the fuel tank 100. The fuel tank 100 normally has a certain volume of liquid fuel 102 and vapor space 103. A valve apparatus 200 according to the present invention is disposed within the fuel tank 100. The valve apparatus 200 can be welded on the outer face or the inner face (i.e. internal wall) of the tank shell 101. The valve apparatus 200 can also be attached by using rivet-snapping or dovetail technique. Such techniques are well known for a skilled person and should therefore not be explained further.

Figure 2:
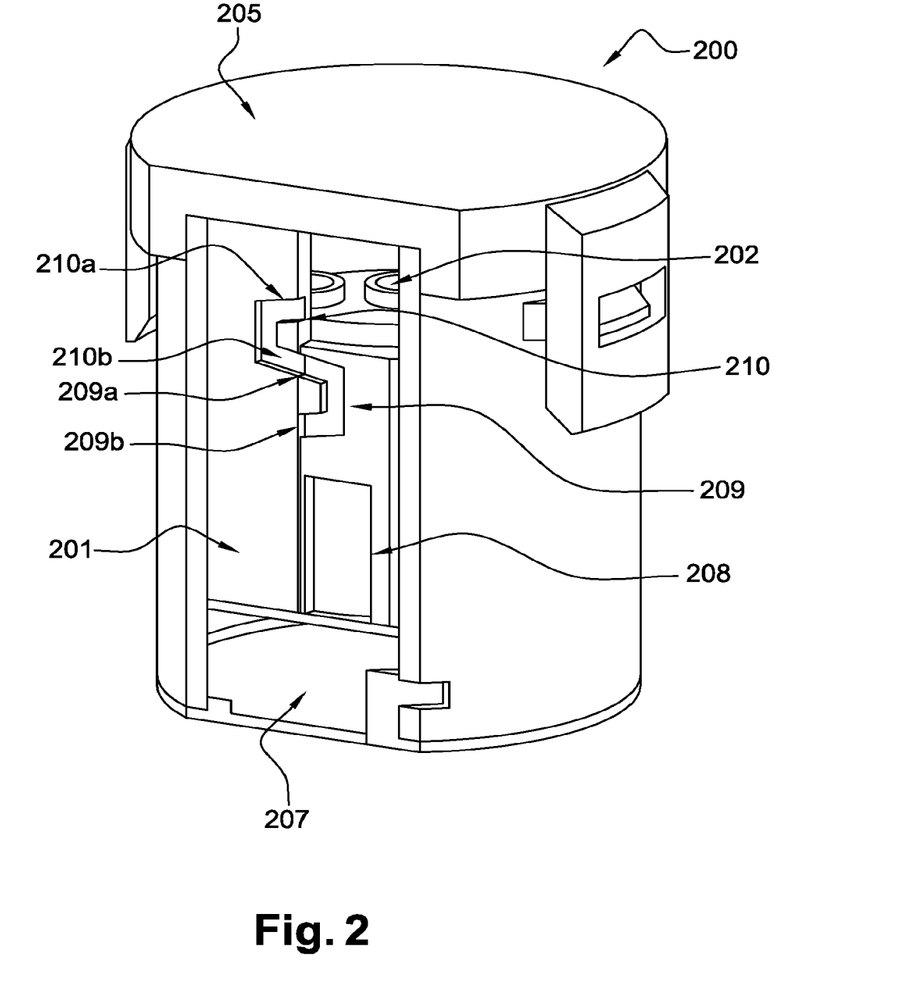
FIG. 2 illustrates schematically a cross-section view of the valve apparatus of FIG. 1.

FIG. 2 shows the valve apparatus 200 according to a particular embodiment of the present invention.

The valve apparatus 200 comprises a casing 201 defining a main chamber 202. The main chamber 202 comprises an inlet orifice 203 (shown in FIG. 1) and an outlet orifice 204 (shown in FIG. 1). The valve apparatus 200 comprises a cover 205, which may either be moulded as one part with the casing 201 or it may form a separate part joined to the latter by any known means (mechanical fastening with a seal; welding etc.). In the illustrated embodiment, the cover 205 is a separate part and is clipped on the top of the casing 201. The cover 205 comprises a coupling section 206 (shown in FIG. 1) (e.g., a quick-connect coupling or a fir-tree nipple) configured to facilitate coupling to one end of a tube or a pipe and of which other end is connected to a carbon canister 300 (see FIG. 1).

The valve apparatus 200 comprises a collection and discharge chamber 207 for the liquid droplets, which have been entrained with the gases coming from the tank 100 (shown in FIG. 1). The collection and discharge chamber 207 is positioned at the bottom of the main chamber 202. Thus, the droplets can be collected and returned back to the tank, for example by gravity.

The valve apparatus comprises a float 208 comprising a closure element (non represented), the float 208 being movable inside the main chamber 202 between a first position and a second position in which the communication between the main chamber 202 and the outlet orifice 204 (shown in FIG. 1) is closed off by the closure element (non represented). The closure element can be a needle seal or a ribbon seal. The valve apparatus 200 comprises a weight control system configured for controlling the weight of the float such that the weight of the float in the second position is lower than the weight of the float in the first position.

In the illustrated embodiment, the weight transfer of the valve apparatus is insured by a first channel 209 formed in the float 208 and a second channel 210 formed in the casing 201. Each channel comprises an inlet orifice 209a, 210a and an outlet orifice 209b, 210b. The load which insures the weight control can be in a solid form, liquid or gas form, as long as it can be transferred in and out from the float.

In the following, it is described with reference to FIGS. 3A-3C a sequence of weight transfer according to a particular embodiment of the present invention.

The weight control system illustrated in these figures comprises one first channel 209 formed in the float 208 and one second channel 210 formed in the casing 201. Each channel 209, 210 comprise an inlet orifice 209a, 210a and an outlet orifice 209b, 210b. The load which insures the weight control is a ball 211. The ball is adapted to roll inside the first and second channels.

Figure 3A:
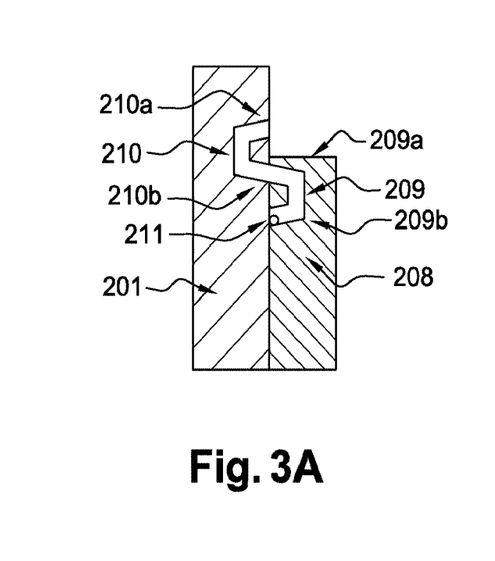
FIGS. 3A-3C are schematic views illustrating a sequence of weight transfer according to an embodiment of the present invention, wherein the float is located in a first, an intermediate, and a second position, respectively.

FIG. 3A shows the float in a first position. In this particular embodiment, the valve apparatus is in an open state (i.e. casing outlet orifice not closed) when the float is in the first position. The ball 211 is inside the inlet orifice of the first channel 209 of the float, and the first channel of the float is in communication with the second channel 210 formed in the casing 201 via the inlet orifice of the float and the outlet orifice of the casing.

Figure 3B:
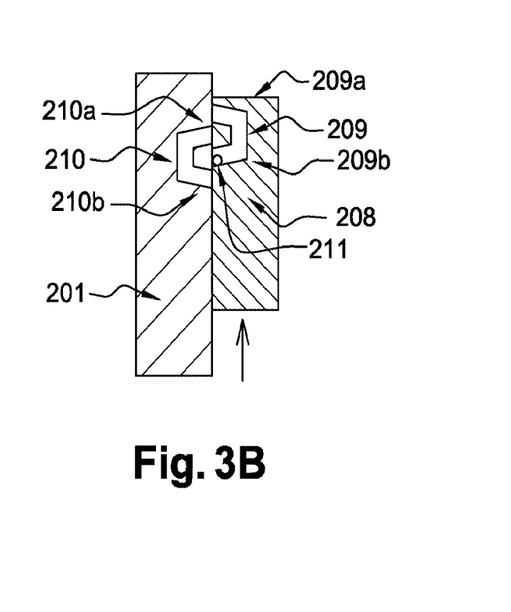

FIG. 3B shows the float 208 in an intermediate position. In this particular embodiment, the valve apparatus 200 is in an intermediate state when the float is in the intermediate position. The liquid level increases in the valve apparatus. The liquid applies a strong upward push against the float. In other words, the liquid applies force acting on the float. Thus, the float is moving along from the first position to the second position.

The ball 211 is in the outlet orifice 209b of the first channel of the float 208, and the first channel 209 of the float 208 is not in communication with the second channel 210 of the casing 201.

Figure 3C:
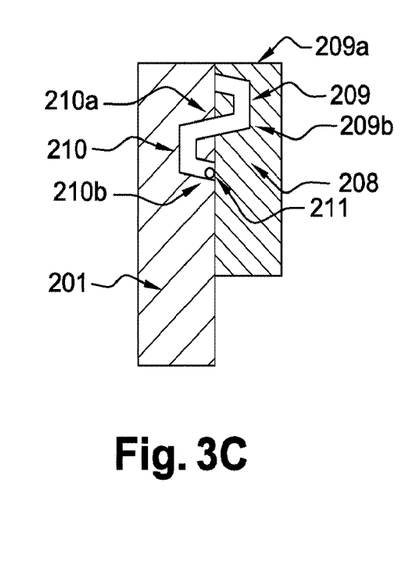

FIG. 3C shows the float 208 in a second position. In this particular embodiment, the valve apparatus 200 is in a closed state (i.e. float outlet orifice closed) when the float is in the second position. Thus, the first channel 209 formed in the float is in communication with the second channel 210 formed in the casing via the outlet orifice 209b of the float and the inlet orifice 210a of the casing. The communication path created between the first and the second channels 209, 210 allows the transfer of the ball 211 from the float 208 to the casing 201.

When the liquid level decreases in the valve apparatus 200, the valve apparatus returns first to the intermediate state. The float 208 is moving along from the second position to the first position. The ball 211 is in the outlet orifice of the second channel 210b of the casing and the second channel 210 of the casing is not in communication with the first channel 209 of the float.

When the liquid level continues to decrease in the valve apparatus 200 until the valve apparatus returns to the fully open state, the float moves along from the intermediate position to the first position. The ball 211 is in the outlet orifice 209b of the first channel of the float and the first channel 209 of the float is in communication with the second channel 210 of the casing.

One will understand that the float can eventually move further downwards from the first position.

In the following, it is described with reference to FIGS. 4A-4C a sequence of weight transfer according to a particular embodiment of the present invention.

The weight control system illustrated in these figures comprises one first channel 209 formed in the float 208 and one second channel 210 formed in the casing 201. Each channel 209, 210 comprise an inlet orifice 209a, 210a and an outlet orifice 209b, 210b. The load which insures the weight control is a ball 211. The ball is adapted to roll inside the first and second channels. The channels 209 and 210 have a shape of helicoids, with the outlet 209b and the inlet 210a being located at the same azimuth around the float 208 so that they coincide when the float is in the second position, and the inlet 209a and the outlet 210b being also at another azimuth around the float, but identical for both 209a and 210b so that they coincide when the float is in the first position.

Figure 4A:
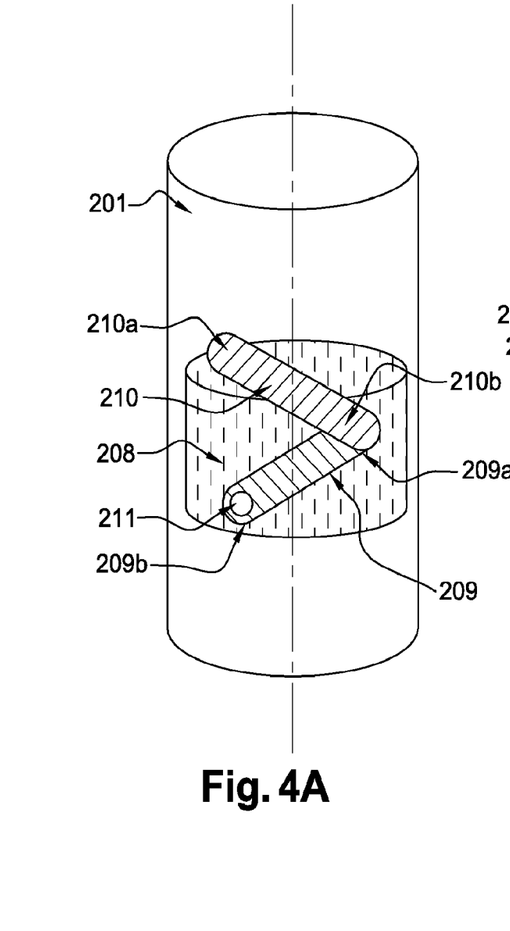
FIGS. 4A-4C are schematic views illustrating the surface of the casing and the float. They show a sequence of weight transfer according to an embodiment of the present invention, wherein the float is located in a first, an intermediate, and a second position, respectively. Throughout the figures, like reference numerals have been used to designate like features.

FIG. 4A shows the float in a first position. In this particular embodiment, the valve apparatus is in an open state (i.e. casing outlet orifice not closed) when the float is in the first position. The ball 211 is inside the inlet orifice of the first channel 209 of the float, and the first channel of the float is in communication with the second channel 210 formed in the casing 201 via the inlet orifice of the float and the outlet orifice of the casing.

Figure 4B:
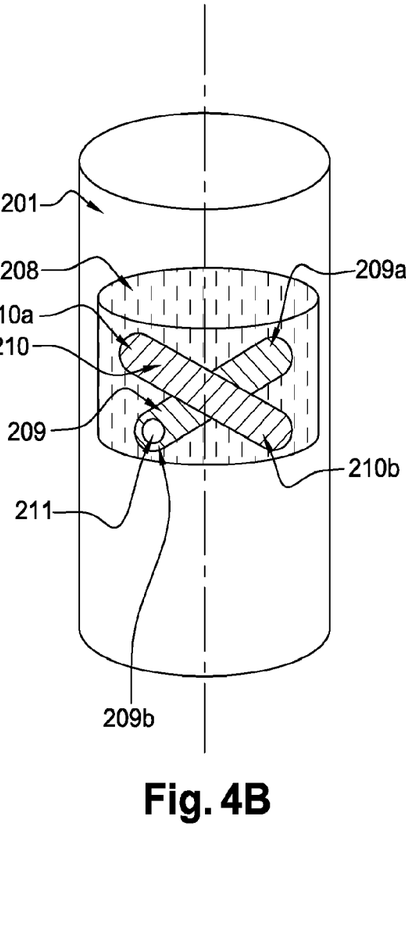

FIG. 4B shows the float 208 in an intermediate position. In this particular embodiment, the valve apparatus 200 is in an intermediate state when the float is in the intermediate position. The liquid level increases in the valve apparatus.

The liquid applies a strong upward push against the float. In other words, the liquid applies force acting on the float. Thus, the float is moving along from the first position to the second position.

The ball 211 is in the outlet orifice 209b of the first channel of the float 208, and the first channel 209 of the float 208 is not in communication with the second channel 210 of the casing 201.

Figure 4C:
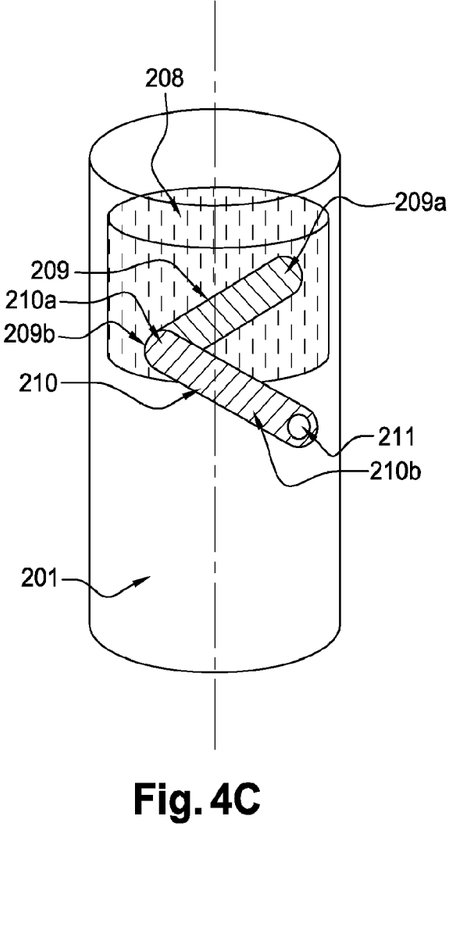

FIG. 4C shows the float 208 in a second position. In this particular embodiment, the valve apparatus 200 is in a closed state (i.e. float outlet orifice closed) when the float is in the second position. Thus, the first channel 209 formed in the float is in communication with the second channel 210 formed in the casing via the outlet orifice 209b of the float and the inlet orifice 210a of the casing. The communication path created between the first and the second channels 209, 210 allows the transfer of the ball 211 from the float 208 to the casing 201.

When the liquid level decreases in the valve apparatus 200, the valve apparatus returns first to the intermediate state. The float 208 is moving along from the second position to the first position. The ball 211 is in the outlet orifice of the second channel 210b of the casing and the second channel 210 of the casing is not in communication with the first channel 209 of the float.

When the liquid level continues to decrease in the valve apparatus 200 until the valve apparatus returns to the fully open state, the float moves along from the intermediate position to the first position. The ball 211 is in the outlet orifice 209b of the first channel of the float and the first channel 209 of the float is in communication with the second channel 210 of the casing.

One will understand that the float can eventually move further downwards from the first position.

It is to note that the constituent elements of the valve apparatus according to the present invention and described above in relation to FIGS. 1-4, can be separately manufactured by injection molding process and then assembled together.

In an alternative, the entire or major part of the constituent elements of the valve apparatus according to the present invention can be manufactured by additive manufacturing process. Said additive manufacturing process can be laser additive manufacturing, laser engineered net shaping, selective laser sintering, electron-beam projection lithography, fused deposition modeling or electron beam melting. Such processes are known in the art.

Although the invention has been described hereinabove by reference to specific embodiments, this is done for illustrative and not for limiting purposes.

It is to note that the valve apparatus of the present invention can also be used in a vehicle tank for the storage of ammonia precursor solutions or ammonia solutions, the latter being especially interesting because of their high vapor pressure, or for the storage of fuel-borne catalysts or exhaust after-treatment additives (for instance, products sold under the tradename Eolys).

The skilled person will appreciate that other variants of the present invention may be within the scope of the attached claims.

The invention claimed is:

1. A valve apparatus for use in a liquid tank, said valve apparatus comprising:
 a casing defining a main chamber, the main chamber having at east one inlet orifice and at least one outlet orifice;
 a float comprising a closure element, the float being movable inside the main chamber between a first position and a second position in which, said at least one outlet orifice is closed off by the closure element;
 a weight control system configured for controlling a weight of the float by transferring a load in and out from the float, such that the weight of the float in the second position is lower than the weight of the float in the first position.

2. The valve apparatus according to claim 1, wherein the valve apparatus is in a closed state, when the float is in the second position.

3. The valve apparatus according to claim 1, wherein the weight control system is configured for adding weight to the float in the first position and for relieving weight on the float in the second position.

4. The valve apparatus according to claim 1, wherein the weight control system uses gravity to realize the transferring of the load.

5. The valve apparatus according to claim 1, wherein the load comprises at least one ball.

6. The valve apparatus according to claim 5, wherein the weight control system comprises at least one first channel formed in the float and at least one second channel thrilled in the casing, said at least one ball being adapted to roll inside the first and second channels, the first and second channels being arranged such that:

in the first position, the first and second channels are in communication with one another so as to allow for transfer of said at least one ball from the casing to the float; and in the second position, the first and second channels are in communication with one another so as to allow for transfer of said at least one ball from the float to the casing.

7. The valve apparatus according to claim 6, wherein, the first and second channels have a shape of helicoids.

8. The valve apparatus according to claim 1, wherein the valve apparatus comprises a collection and discharge chamber, which is positioned at a bottom of the main chamber.

9. The valve apparatus according to claim 1, wherein the casing and the float are made of plastic.

10. A fuel tank comprising at least one valve apparatus wherein said at least one valve apparatus is according to claim 1 and is attached to said fuel tank, wherein said fuel tank comprises the liquid tank.

11. A motor vehicle comprising a fuel tank, wherein the fuel tank is according to claim 10.

* * * * *